United States Patent [19]

Hansch

[11] Patent Number: 4,955,832
[45] Date of Patent: Sep. 11, 1990

[54] VEHICLE PROPULSION SYSTEM
[76] Inventor: Ronald V. Hansch, P.O. Box 1964, San Francisco, Calif. 94101-1964
[21] Appl. No.: 268,216
[22] Filed: Nov. 7, 1988
[51] Int. Cl.$^5$ .............................................. B63H 19/02
[52] U.S. Cl. ....................................... 440/9; 440/113
[58] Field of Search ................... 440/9, 10, 5, 38, 113; 60/748, 755, 39.464

[56] References Cited
U.S. PATENT DOCUMENTS
4,337,052  6/1982  Kitabayashi ............................ 440/9
4,338,782  7/1982  Marchand ......................... 60/39.464

Primary Examiner—Sherman D. Basinger
Assistant Examiner—Edwin L. Swinehart
Attorney, Agent, or Firm—Alvin E. Hendricson

[57] ABSTRACT

A propulsion unit comprises an elongated chamber having a front closed end and a rear open end with a side opening having a decreasing cross section inwardly of the chamber and directing incoming fluid tangentially of curved internal chamber walls for imparting a spin motion to such fluid for immediately redirecting fluid motion into an inwardly spiraling and longitudinally spreading flow outwardly of the open chamber end to propel the chamber forwardly. The unit operates with random wave motion as well as with expanding gases from a combustion chamber.

11 Claims, 3 Drawing Sheets

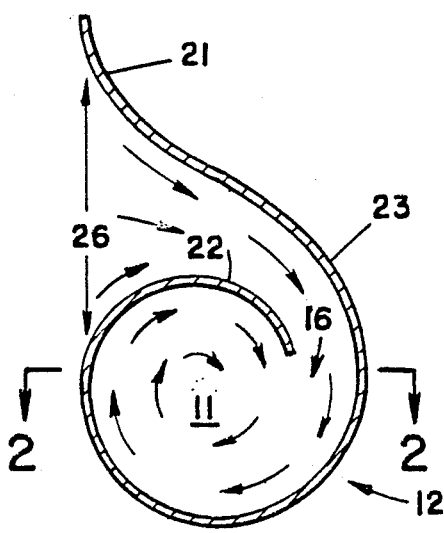
FIG_1
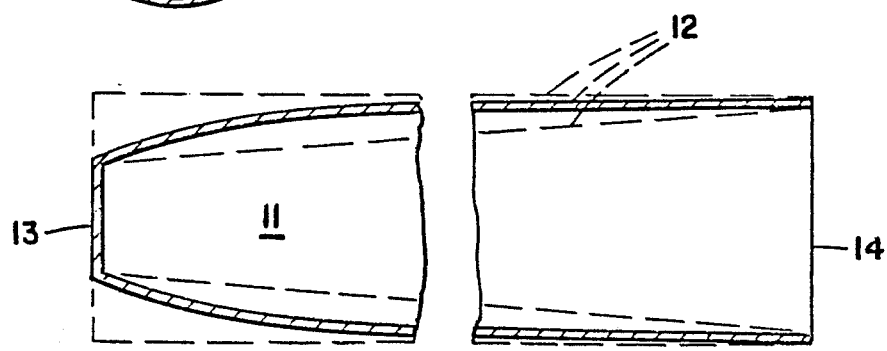
FIG_2
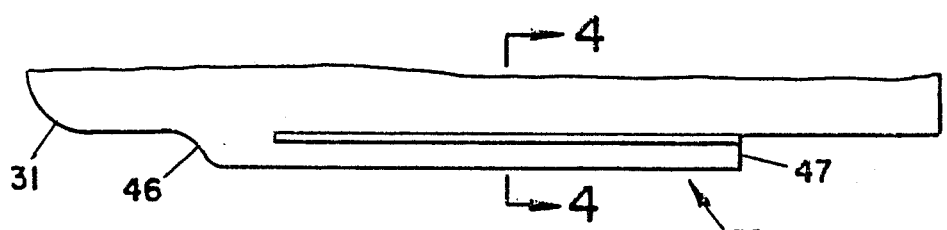
FIG_3
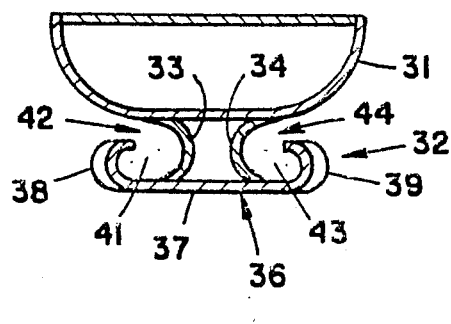
FIG_4

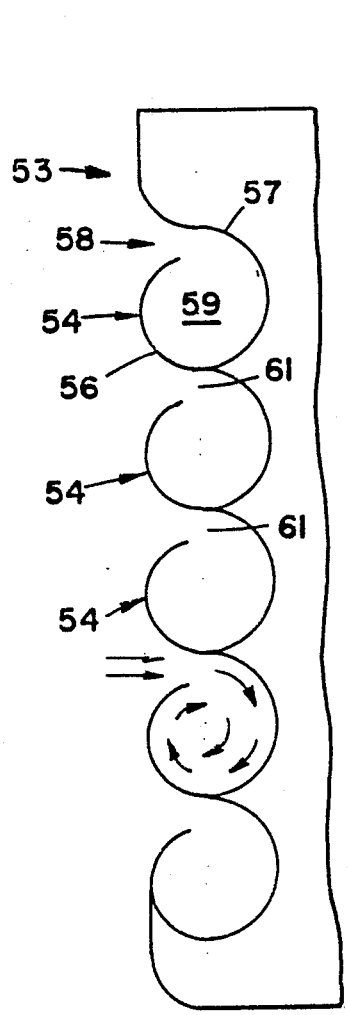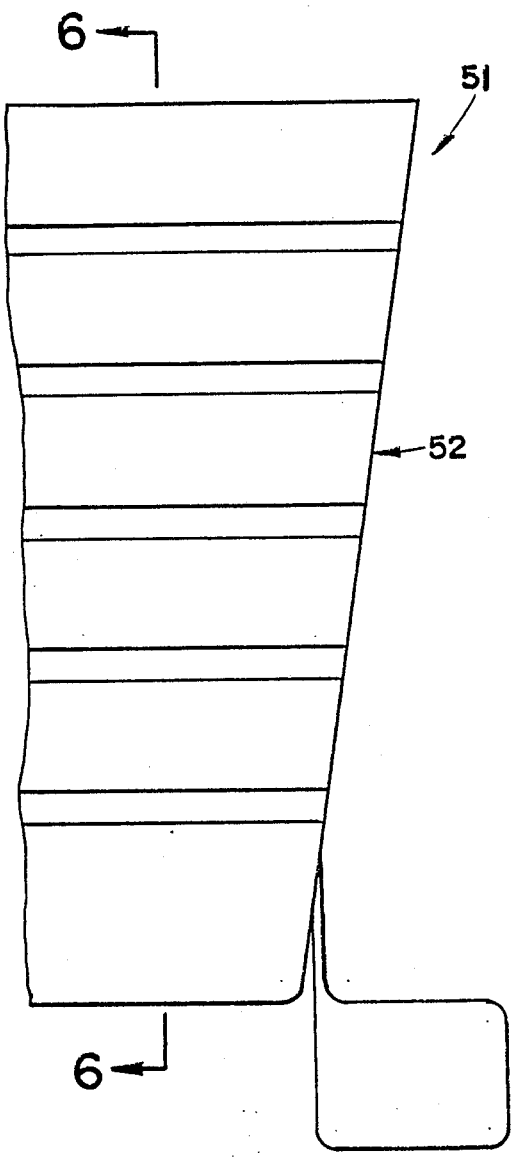
FIG_6  FIG_5

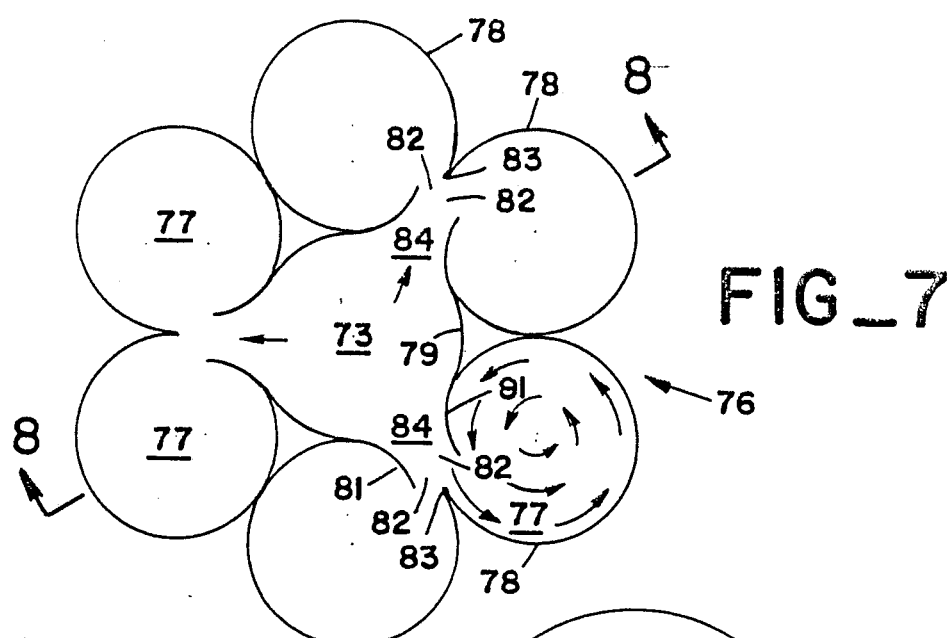
FIG_7
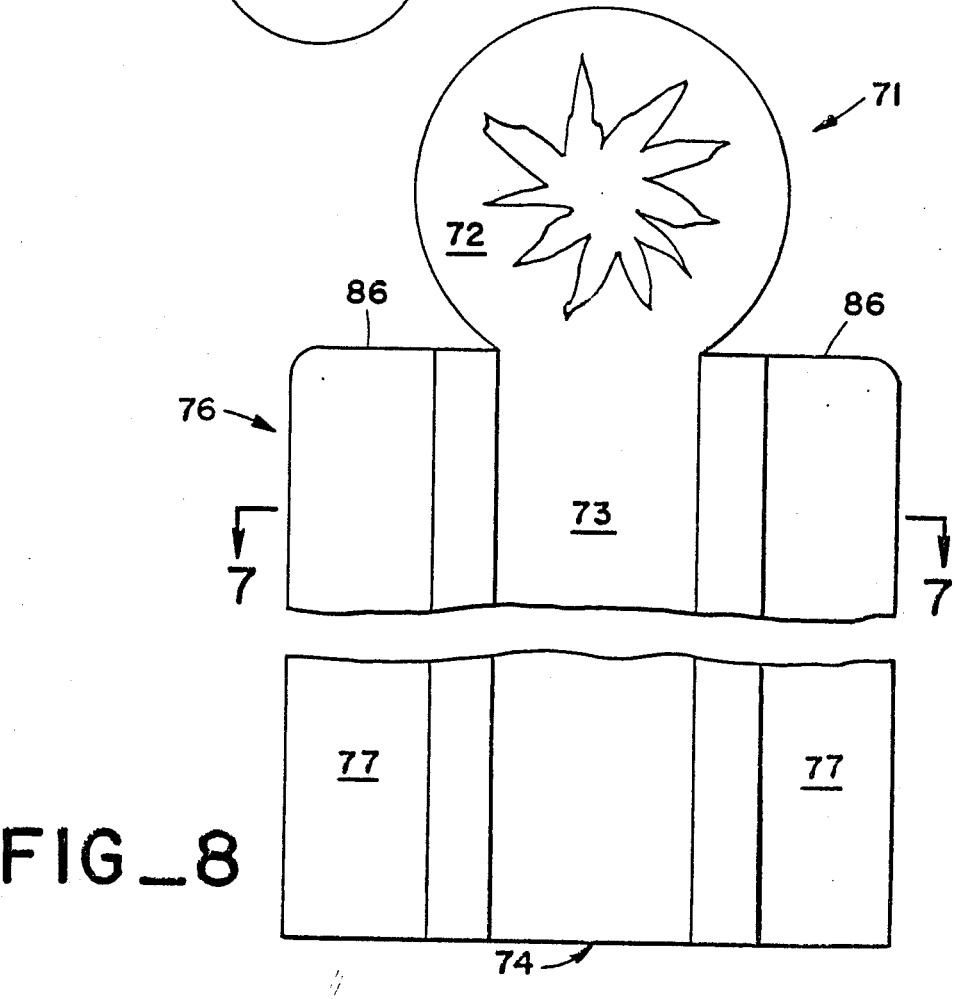
FIG_8

VEHICLE PROPULSION SYSTEM

FIELD OF INVENTION

The present invention is directed to maximization of useful thrust from a fluid that may have random motions such as waves in a body of water. Although the present invention has wide application in a variety of fields, the application as a wave propelled vehicle is herein chosen as a representative example, with notations regarding various other applications.

There has been developed systems designed to tap the energy of water waves and these have been employed, for example, to generate electricity. Such systems are generally stationary units having movable elements rotated or otherwise driven by wave motion to produce a net force from relatively random wave motion.

The concept of producing a propulsive force for a boat or the like by wave motion has also been investigated. However, somewhat complicated systems and mechanisms have been required to harness random wave motion for this purpose. Also, movement through waves to be employed for propulsion is normally somewhat self defeating and at least certain approaches to the problem cause unwanted motions that are quite undesirable from the viewpoint of possible passengers on vehicles propelled thereby.

The present invention provides a propulsion unit for a wave vehicle powered by random wave motion and, in fact, requires no moving parts for the generation of a propulsive force. A vehicle so powered does not incorporate any undesirable additional motions or rotations so as to be readily adapted to carry passengers while being quite simply controlled and steered.

SUMMARY OF INVENTION

The present invention is particularly applicable to the propulsion of a unit by random wave motion in water and thus the following description is primarily related to a wave motion vehicle, but also includes an expanding gas application.

A propulsion unit in accordance herewith comprises a particularly configured chamber having a closed front end, an open back end and may have an increasing cross section toward the open back end. The chamber has a side opening along the length thereof with such side opening having a decreasing cross section inwardly of the chamber and the chamber having a cross section of decreasing diameter such as a spiral shape. Wave motion of water about the unit, for example, will force water through the side opening of the chamber for imparting an internal spin to the water to establish a centrifugal momentum tending to resist reverse flow of water.

The chamber may have a non-uniform longitudinal cross section that may be conical or parabolic, for example, and water entering through the side will exit through the rear open end to provide a propulsive force. Entering water is spun or spiralled to capture the water inside the chamber and the water exerts a radial force on the expanding chamber walls in flowing to the rear of the chamber for also applying a net forward force on the chamber walls.

The system hereof provides a propulsion unit operable by incoming fluid, such as water from wave motion, to provide a forward propulsive force to the unit without requiring any moving parts. A wave vehicle in accordance herewith will be propelled to move forwardly by random wave motion in water wherein the vehicle is floated. It is noted that the principles and system of this invention may also be advantageously employed with fluids such as gases from combustion, as in a rocket engine.

BRIEF DESCRIPTION OF DRAWINGS

The present invention is illustrated with respect to preferred embodiments thereof in the accompanying drawings wherein;

FIG. 1 is a schematic cross sectional view of a propulsion chamber in accordance with the present invention;

FIG. 2 is a longitudinal sectional view taken in the plane 2—2 of FIG. 1;

FIG. 3 is a side elevation of a wave vehicle or boat incorporating the vehicle propulsion system of the present invention;

FIG. 4 is a partial sectional view taken in the plane 4—4 of FIG. 3;

FIG. 5 is a partial side elevational view of a wave vehicle incorporating a multiple propulsion unit of the vehicle propulsion system of the present invention;

FIG. 6 is a partial transverse sectional view of a multiple propulsion unit in accordance with the present invention and taken in the plane 6—6 of FIG. 5;

FIG. 7 is a transverse sectional view of a rocket propulsion system taken in the plane 7—7 of FIG. 8 and employing propulsion units in accordance with the present invention; and FIG. 8 is a longitudinal sectional view taken in the plane 8—8 of FIG. 7.

DESCRIPTION OF PREFERRED EMBODIMENT

The propulsion system of the present invention comprises one or more propulsion chambers 11 as illustrated, for example, in FIGS. 1 and 2 of the drawings. Referring to these Figures, it will be seen that the chamber 11 is defined by a generally tubular or cylindrical wall 12 with a front end wall 13 closing the front end of the chamber 11, and the chamber having an open rear end 14. The chamber 11, as illustrated in FIG. 2, may be formed with an increasing cross section toward the rear open end 14. The chamber wall 12 may be formed as a parabola, cone or the like but may also be formed with a uniform cross section between front and rear, as indicated by the dashed lines in FIG. 2. The chamber 11 is provided with a side opening 16 extending along the length thereof. The side wall or walls 12 of the chamber are formed in a spiral configuration as illustrated in FIG. 1 so as to define the opening 16 between the inner end of the wall 12 and the laterally displaced portion of such wall. In addition, the chamber wall 12 extends upwardly beyond the opening 16 and merges with an outwardly flared portion 21. An upwardly and inwardly curving front portion 22 of the wall 12 terminates at the opening 16 in spaced relation to a back upwardly spiraling wall portion 23. There will thus be seen to be provided an enlarged side opening 26 tapering inwardly between the front or lower wall portion 22 and the upper and rear wall portions 21 and 23 to the opening 16 into the chamber proper. The chamber 11 thus is provided with a longitudinal side opening 16 of decreasing cross section from the outer opening 26 to the inner opening 16, with the walls defining same smoothly curving inwardly to the opening 16 for directing fluid into the chamber 11 tangentially to the spiral wall 12 thereof.

The chamber 11 described above is adapted to receive a fluid such as water or the like, that will flow as indicated by the small arrows in FIG. 1 through the opening of decreasing cross section into the chamber 11 whereat the flow will move about the spiral walls of the chamber to impart a spinning motion to the fluid that tends to direct the fluid into the center of the chamber 11, again as indicated by the small arrows within the chamber. Such direction of fluid militates against the flow of fluid in the opposite direction out of the opening 16 and serves to entrap the fluid within the chamber. Fluid flowing into the chamber 11 through the side opening 16 will attempt to flow toward the opposite ends of the chamber but, inasmuch as the front end 13 is closed, will actually flow out the open end 14. Thus, there will be produced a flow of fluid into the chamber along the length thereof and axially out of the rear open end of the chamber, and such flow produces a propulsive force to move the chamber to the left in FIG. 2, for example.

Considering the situation wherein the present invention is adapted to operate upon wave motion, as in a body of water, it will be seen that as a wave rises to cover the opening 26, water will flow into the chamber through opening 16 and to spiral inwardly within the chamber and to spread longitudinally of the chamber to ultimately flow out the open end 14 thereof. Successive waves rising over the opening 26 will thus produce a pulsating flow of water through the chamber and will propel the chamber forwardly.

One possible manner of employing the propulsion system of the present invention on a wave vehicle is illustrated in FIGS. 3 and 4, and referring thereto there will be seen to be provided a hull 31 having a double propulsion unit 32 attached to the underside thereof. This double propulsion unit 32 may be formed as shown in FIG. 4 by a pair of oppositely curved walls 33 and 34 secured to the underside of the hull 31 and curving inwardly and downwardly therefrom, and thence laterally outward into engagement with a bottom element 36 having a flat central portion 37 and upwardly and inwardly curved ends 38 and 39. The curved walls 33 and 38 at the left of FIG. 4 define an elongated chamber 41 which increases in cross section toward the rear of the unit 32, and which has a small longitudinal opening 42 between the back wall 33 and inner end of the wall 38. The back wall 33 merges into the curved under portion of the hull 31, so that the opening 42 is in fact defined by inwardly curving surfaces as in the manner of FIG. 1 of the drawing described above. The walls 34 and 39 of the unit 32 form an elongated chamber 43 having a longitudinal opening 44 and being a mirror image of the chamber 41. The chambers 41 and 43 may be defined by spiral walls or approximations thereto, and it will be seen that both chambers are adapted to receive the incoming flow of fluid through the openings 42 and 44, and to immediately redirect such flow into an inwardly spiraling motion in the manner described above with respect to FIG. 1. The forward end of propulsion unit 32 is closed as indicated by the curved shroud or the like 46 that may have a tapered configuration toward the forward end of the hull 31, and which seals or closes the front ends of the chambers 41 and 43.

Placement of the vehicle of FIG. 3 in a body of water having surface waves will cause waves to rise and fall above and below the openings 42 and 44 to the chambers 41 and 43, respectively. The unit is designed to float at such a level that surface waves will rise and fall above these openings to the propulsion unit, and such wave action will then cause a flow of water through the propulsion unit to exit from an open rear end 47 for each of the chambers 41 and 43. Tests of a unit formed as generally described with respect to FIGS. 3 and 4 has proven the unit to move steadily through the water, and in fact to move up stream from a flow of water. Such test was conducted in the Vaillan Court Fountain pool at the foot of Market Street in San Francisco, Calif.

As noted above, the propulsion chamber of the present invention is preferably formed with a spiral cross section, however, variations from this configuration are possible. Thus, for example, the front or outer wall 22 and the back or rear wall 23 may be formed as semicirles of different diameter. In this respect, reference is made to FIGS. 5 and 6 illustrating not only the foregoing configurations of the propulsion chambers, but also a portion of a wave vehicle employing the propulsion chamber of the present invention in multiple array. Referring to these figures there will be seen to be shown, in part, a wave vehicle 51 having a hull 52 with the sides 53 thereof formed as a "panel" of vertically stacked propulsion units 54. Each of these units 54 is comprised as a semicircular outer wall 56 and larger diameter semicircular inner wall 57 smoothly joined together at the bottom of each with the rear or inner wall 57 then extending upwardly from the outer wall 56 to form an opening 58 into the interior of a chamber 59 defined by the walls.

The chamber 59 is closed at the front end and open at the rear end. It will be seen that inwardly curving portions of outer walls 56 of successive propulsion units 54 provide a decreasing cross section of the opening 58 to a throat 61 directed toward the rear wall 57 of each of the chambers 59. Thus, fluid, such as water from waves rising along the side of the hull, will pass into the chambers 59 through the openings 58 and throats 61 thereof into contact with the curved rear wall 57 of each chamber to thus swirl or move in a circular motion of decreasing diameter within the chamber. This then militates against movement of such fluid out of the openings 58 so that the fluid circulates within the chambers and spreads rearwardly thereof to exit from the open rear ends of the chambers. This produces a net propulsive force on the vehicle 51 to move same to the left in FIG. 5. It will, of course, be appreciated that cessation or termination of this propulsive force may be accomplished by closing the openings 58 in a variety of known manners, such as by raising or lowering a member or members over the sides 53 of the vehicle. The termintation of propulsion force may also be accomplished by opening the front end of the chamber or chambers so fluid flows equally out of both ends or by closing the rear end or ends so fluid cannot flow out. Clearly a combination of the foregoing may be employed to reverse the thrust or propulsion force. The propulsion chambers thus operate in the same general manner as described above with respect to FIGS. 1 and 2 wherein a truly spiral cross section is provided for each chamber. It will, of course, also be noted that the spiral units of FIGS. 1 and 2 may be vertically stacked as described herein and illustrated, for example, in FIG. 6.

The present invention is also highly useful in various other applications. The device hereof produces thrust by ordering otherwise random motions and effectively isolating and harnessing the net perpendicular entering motion component of adjacent fluid motions, so as to be applicable, for example, in rocket propulsion. In this respect, reference is made to FIGS. 7 and 8 illustrating a rocket application hereof in tranverse section and longitudinal section, respectively. There is illustrated a rocket 71 having a spherical combustion chamber 72 with a central elongated chamber 73 extending therefrom toward a rear open end 74 of the rocket. About this central chamber 73 there is provided a cluster 76 of individual propuslion or spin chambers 77. These chambers 77 may, for example, be formed with a generally circular cross section defined by a cylindrical wall 78. The chambers 77 are disposed contiguously about and adjacent to the central chamber 73 and each communicates therewith substantially over the length of same. Such communication is provided by a merging of the chamber walls 78 with an outwardly curved portion of a wall 79 defining the central chamber 73, as indicated at 81 to form openings 82 into the chambers 77, with the wall portion 81 directing fluid tangentially into the chambers 77 from the chamber 73. In order to balance the torque of the rocket, an even number of chambers 77 are provided in the cluster 76, and the merged wall portions 81 are alternated in direction into successive chambers 77. Thus, for adjacent chambers 77 shown at the lower right of FIG. 7, a pair of inwardly curved portions 81 are disposed opposite to each other to form an opening of decreasing cross section radially outward of the central chamber 73, and split into two adjacent openings 82 by the confluence of the chamber walls 78 of the adjacent chambers 77. It will seen that this arrangement provides for fluids, such as gases, in the central chamber 73 to expand through a converging opening defined by facing walls 81 into the chambers 77 through a pair of throats 82 into tangential engagement with the walls 78 of adjacent chambers 77. The confluence of walls 78 of adjacent chambers 77 form a dividing wall 83 of the converging opening 84 from the chamber 73, so that gases exiting the central chamber 73 spin in opposite directions in contiguous chambers 77.

It will be seen that the present rocket configuration described above differs from conventional liquid fuel rockets which produce thrust from the expanding gases from a combustion chamber by means of a parabolic deflector, or thrust chamber. The present rocket produces thrust by causing the expanding gases to order themselves into inwardly spiraling and spreading sheets in the spin chambers 77 that are arranged in a torque balanced cluster about the central cylindrical chamber 73 directly connected to the combustion chamber 72. As hot gases expand down the central cylindrical chamber 73, the molecules which are not moving in line with the net flow toward the open rear end of the rocket will leave the central cylindrical and become trapped in the surrounding spin chambers so that they no longer interfere with the axial flow through the central chamber. The foregoing may be considered as somewhat analogous to an evaporative cooler and, as the gases enter the spin chambers 77, they are initially directed against the inside walls of these chambers by their net momentum which results in their paths becoming better aligned in order to accomplish better conversion of kinetic energy to thusst. The upper ends of the spin chambers 77 are closed as indicated by the walls 86, and thus exhaust gases from the combustion chamber that are continuously entering the spin chambers will spiral inwardly and constantly spread in the direction of the open lower ends of these chambers at the open end 74 of the rocket 71. As a consequence of the foregoing, there is herein achieved a much better conversion of heat energy to total thrust than in conventional rockets.

The spin chambers or propulsion chambers 77 of the rocket propulsion system described above are formed with a generally circular cross section having a longitudinal opening therein directed tangentially to the walls defining the chambers. Such "generally circularly configuration" is preferably a spiral configuration as described above in connection with FIG. 1 of the drawings. However, for ease of manufacture, the chamber walls 78 may in fact be circular except for the inwardly curved portion 81. Alternatively, the chambers may be formed with a configuration such as illustrated in FIG. 6 of the drawings, and described above.

It is also noted that the rocket propulsion system hereof operates upon a continuously entering gas into the propulsion chambers rather than a pulsed entry as in the case of wave motions. But in all cases fluid entering the propulsion chambers are directed tangentially to the walls thereof over at least a substantial portion of the length of the chambers. In this manner, the entering fluid is directed into an ordered motion spinning about the chambers in a path of reducing radius and spreading toward the open end of the chamber. Fluid flowing into the chamber hereof along the length thereof may be considered as a sheet of fluid directed by the incoming momentum thereof about the inner wall of the chamber to spiral inward in a coil of decreasing thickness, spreading toward the open end of the chamber so that the closer it gets to the center of the chamber the more nearly it is moving in a straight line out the open end. The present invention achieves thrust by ordering an end to end alignment of forces, as the chamber configuration causes the entering fluid to arrange itself into inwardly coiling and longitudinally spreading sheets. The present invention is thus capable of producing useful thrust from the relatively random motions of waves, for example, and also is capable improving or enhancing the trust available from expanding gases, for example.

The present invention has been described above with respect to particular preferred embodiments thereof and certain advantageous applications of the present invention, however, it will be apparent to those skilled in the art that numerous modifications and variations are possible within the spirit and scope of the present invention.

What is claimed is:

1. A propulsion unit comprising
    means defining an elongated chamber having a first closed end and a second open end axially of said chamber,
    means defining an elongated opening longitudinally of said chamber with the width of such opening decreasing as it progresses inwardly into said chamber, and
    said chamber having a curved inner wall in cross section with said opening being tangentially aligned with said curved wall whereby fluid entering said chamber through said opening is redirected into a spiral path within the chamber to flow axially from the second end thereof for producing an axial propulsive force.

2. The unit of claim 1 further defined by said chamber having a generally parabolic configuration in longitudinal cross section.

3. The unit of claim 1 further defined by said chamber having an elongated generally conical configuration in longitudinal cross section.

4. The unit of claim 1 further defined by said longitudinal opening being disposed to open laterally into the top of said chamber and having the sides thereof curved toward each other in a direction toward said chamber for directing fluid tangentially into said chamber.

5. The unit of claim 1 further defined by said curved inner wall having a substantially spiral configuration with said opening being disposed between a back and front portion of said wall for directing fluid about said wall to coil inwardly and spread longitudinally toward the open end of said chamber.

6. The propulsion unit of claim 1 further defined by said chamber having a semicircular back wall configuration having a larger radius than a semicircular front wall portion with said wall portions being joined together along a common edge and being separated at the opposite edges to form said opening.

7. A propulsion unit comprising
 means defining a plurality of elongated chambers with each having a first closed end and a second open end axially of said chamber with said chambers having adjacent closed ends and adjacent open ends,
 means defining a plurality of elongated openings longitudinally of said chambers with the width of each opening decreasing as it progresses inwardly into each of said chambers, and
 said chambers each having a curved inner wall in cross section with said opening being tangentially aligned with said curved wall whereby fluid entering said chamber through said opening is redirected into a spiral path within the chamber to flow axially from the second end thereof for producing an axial propulsive force.

8. The unit of claim 7 further defined by said chambers being disposed in a substantially vertical array with said openings being disposed one above the other and receiving fluid from the same direction.

9. The propulsion unit of claim 7 further defined by means disposing said plurality of chambers in annular array about means defining a central cylindrical open-ended chamber and having the chamber openings communicating with said central chamber for receiving fluid from said central chamber to redirect such fluid out of adjacent open ends of said chambers.

10. The propulsion unit of claim 9 further defined by said chambers being disposed in pairs about said central chamber with said openings directing fluid in opposite directions into the chambers of each pair of chambers.

11. A wave propulsion unit comprising
 a casing having walls defining a plurality of elongated horizontal chambers having closed front ends and open rear ends with a generally circular cross section of each chamber increasing in diameter toward the rear open end thereof,
 said chambers being aligned one above the other in substantially contiguous relation,
 means defining an inwardly tapering opening along the side of each of said chambers for directing water from surface waves tangentially into said chambers for causing such water to spin in the chambers for redirecting such water to flow out of the open ends of said chambers.

* * * * *